(12) United States Patent  
MacGougan et al.

(10) Patent No.: US 8,615,253 B2
(45) Date of Patent: Dec. 24, 2013

(54) STATE ESTIMATION USING MOTION CONTEXT AND MULTIPLE INPUT OBSERVATION TYPES

(75) Inventors: Glenn Donald MacGougan, San Jose, CA (US); Lukas M. Marti, Santa Clara, CA (US); Robert Mayor, Half Moon Bay, CA (US)

(73) Assignee: Apple Inc., Cupertino, CA (US)

( * ) Notice: Subject to any disclaimer, the term of this patent is extended or adjusted under 35 U.S.C. 154(b) by 101 days.

(21) Appl. No.: 13/153,329

(22) Filed: Jun. 3, 2011

(65) Prior Publication Data

US 2012/0309411 A1 Dec. 6, 2012

(51) Int. Cl.
*H04W 24/00* (2009.01)
(52) U.S. Cl.
USPC .................................. 455/456.1; 342/357.23
(58) Field of Classification Search
USPC .......... 455/456.1, 456.3; 340/357.23, 357.25, 340/357.63
See application file for complete search history.

(56) References Cited

U.S. PATENT DOCUMENTS

| | | | |
|---|---|---|---|
| 5,075,693 A | 12/1991 | McMillan et al. | |
| 5,165,269 A | 11/1992 | Nguyen | |
| 5,349,529 A | 9/1994 | Masumoto et al. | |
| 5,761,094 A | 6/1998 | Olson et al. | |
| 5,946,813 A | 9/1999 | Nachbaur et al. | |
| 6,311,129 B1 | 10/2001 | Lin | |
| 6,384,384 B1 | 5/2002 | Connolly et al. | |
| 6,408,245 B1 | 6/2002 | An et al. | |
| 6,424,914 B1 | 7/2002 | Lin | |
| 6,508,316 B2 | 1/2003 | Estes et al. | |
| 6,539,639 B2 | 4/2003 | Smith | |
| 6,622,091 B2 | 9/2003 | Perlmutter et al. | |
| 6,651,003 B2 | 11/2003 | Woloszyk et al. | |
| 6,768,452 B2 | 7/2004 | Gilkes | |
| 6,807,485 B1 | 10/2004 | Green | |
| 6,964,107 B1 | 11/2005 | Ahola | |
| 6,988,049 B1 | 1/2006 | Wirtz et al. | |
| 7,158,882 B2 | 1/2007 | Abraham et al. | |
| 7,196,660 B2 | 3/2007 | Abraham et al. | |
| 7,210,236 B2 | 5/2007 | Sato et al | |
| 7,248,983 B2 | 7/2007 | Fillatreau et al. | |

(Continued)

FOREIGN PATENT DOCUMENTS

| EP | 1 221 586 | 7/2002 |
|---|---|---|
| JP | 2005-134343 | 5/2005 |
| WO | WO 2008/122904 | 10/2008 |
| WO | WO 2009/068116 | 6/2009 |

OTHER PUBLICATIONS

An Overview of the Earth's Magnetic Field, "The Earth's Magnetic Field—An Overview," [Online] [Retrieved on May 16, 2009]. Retrieved from the Internet: URL: http://www.geomag.bgs.ac.uk/earthmag.html, 10 pages.

(Continued)

*Primary Examiner* — Sam Bhattacharya
(74) *Attorney, Agent, or Firm* — Fish & Richardson P.C.

(57) ABSTRACT

Techniques for estimating the current state (e.g., position, velocity) of a mobile device based on motion context and multiple input observation types are disclosed. In some implementations, an Extended Kalman Filter (EKF) formulation is used to combine multiple input observations received from a variety of sources (e.g., WiFi, cell, GPS) to compute a minimum error state estimate. In some implementations, the EKF is updated using position estimates from an active cell and/or a candidate active cell during a cell-hopping event.

27 Claims, 10 Drawing Sheets

(56) References Cited

U.S. PATENT DOCUMENTS

| | | |
|---|---|---|
| 7,275,008 B2 | 9/2007 | Plyvänäinen |
| 7,324,906 B2 | 1/2008 | Sato et al. |
| 7,331,115 B2 | 2/2008 | Schierbeek et al. |
| 7,346,452 B2 | 3/2008 | Ford et al. |
| 7,388,541 B1 | 6/2008 | Yang |
| 7,391,366 B2 | 6/2008 | Park et al. |
| 7,400,974 B2 | 7/2008 | Fuchs et al. |
| 7,415,354 B2 | 8/2008 | Alexander |
| 7,451,549 B1 | 11/2008 | Sodhi et al. |
| 7,458,166 B2 | 12/2008 | Parks et al. |
| 7,548,200 B2 | 6/2009 | Garin |
| 7,565,839 B2 | 7/2009 | Stewart et al. |
| 7,631,119 B2 | 12/2009 | Moore et al. |
| 7,891,103 B2 | 2/2011 | Mayor et al. |
| 7,921,572 B2 | 4/2011 | Mayor et al. |
| 8,061,049 B2 | 11/2011 | Mayor et al. |
| 8,239,153 B2 | 8/2012 | Piemonte et al. |
| 2003/0135327 A1 | 7/2003 | Levine et al. |
| 2005/0174324 A1 | 8/2005 | Liberty et al. |
| 2005/0223575 A1 | 10/2005 | Fillatreau et al. |
| 2005/0240347 A1 | 10/2005 | Yang |
| 2005/0246099 A1 | 11/2005 | Jendbro et al. |
| 2006/0066295 A1 | 3/2006 | Tamura et al. |
| 2006/0190174 A1 | 8/2006 | Li et al. |
| 2006/0195254 A1 | 8/2006 | Ladetto et al. |
| 2006/0271295 A1 | 11/2006 | McLaren et al. |
| 2006/0287824 A1 | 12/2006 | Lin |
| 2007/0156337 A1 | 7/2007 | Yanni |
| 2008/0066331 A1 | 3/2008 | Bzezinski et al. |
| 2008/0143595 A1 | 6/2008 | Colley et al. |
| 2008/0147686 A1 | 6/2008 | Colley et al. |
| 2008/0201096 A1 | 8/2008 | Wright et al. |
| 2009/0033807 A1 | 2/2009 | Sheng et al. |
| 2009/0054075 A1 | 2/2009 | Boejer |
| 2009/0070058 A1 | 3/2009 | Lin |
| 2009/0089001 A1 | 4/2009 | Lin |
| 2009/0171607 A1 | 7/2009 | Chen et al. |
| 2009/0172599 A1 | 7/2009 | Nezu |
| 2009/0281729 A1 | 11/2009 | Duffett-Smith et al. |
| 2009/0326851 A1 | 12/2009 | Tanenhaus |
| 2010/0121599 A1 | 5/2010 | Boeve et al. |
| 2010/0305853 A1 | 12/2010 | Schulze et al. |
| 2010/0312513 A1 | 12/2010 | Mayor et al. |
| 2010/0312519 A1 | 12/2010 | Huang et al. |
| 2011/0054787 A1 | 3/2011 | Mayor et al. |
| 2011/0059752 A1* | 3/2011 | Garin et al. ............... 455/456.1 |
| 2011/0106474 A1 | 5/2011 | Kulik et al. |
| 2011/0241656 A1 | 10/2011 | Piemonte et al. |
| 2011/0246117 A1 | 10/2011 | Moore et al. |
| 2012/0086438 A1 | 4/2012 | Tu |
| 2012/0173195 A1* | 7/2012 | Opshaug et al. ............... 702/151 |

OTHER PUBLICATIONS

Adiprawita, et al., "Development of AHRS (Attitude and Heading Reference System) for Autonomous UAV (Unmanned Aerial Vehicle)," Proc Int'l Conf Electrical Engineering and Informatics, Institut Teknologi Bandung, Indonesia, Jun. 17-19, 2004, 4 pages.

Apptism, iTopoMaps, © 2009 Apptism, [Online] [Retrieved on Jun. 2, 2009]. Retrieved from the Internet: URL: http://www.apptism.com/apps/itopomaps, 4 pages.

Apptism, Compass Go, © 2009 Apptism, [Online] [Retrieved on Jun. 3, 2009]. Retrieved from the Internet: URL: http://www.apptism.com/apps/compass-go, 2 pages.

Apptism, Focalware, © 2009 Apptism, [Online] [Retrieved on Jun. 3, 2009]. Retrieved from the Internet: URL: http://www.apptism.com/apps/focalware, 2 pages.

Camps. et al., "Numerical Calibration for 3-Axis Accelerometers and Magnetometers," IEEE, 2009, pp. 217-221.

Goulet, "Magenetic Declination, Frequently Asked Questions," Oct. 2001, Version 4.4, [Online] [Retrieved on May 16, 2009]. Retrieved from the Internet: URL: http://www.geocities.com/magnetic_declination/, 16 pages.

Harper, et al., "Process for Improving GPS Acquisition Assistance Data and Server-side Location Determination for Cellular Networks," 2004 Intl Symp on GNSS/GPS, Dec. 6-8, 2004, Sydney, Australia, 15 pages.

"Honeywell 3-Axis Digital Compass IC, MC5843 Electronic Compass," Honeywell International Inc. [online]; retrieved from the Internet: <URL: http://www.honeywell.com/sites/portal?smap=aerospace&page=Magnetic-Sensors3&theme=T15&catID=CF84B17AB-A90F-716D-10BC-A1E75441138E&id=HF916B4E0-4F71-9DB5-DFA8-51B1944918EE&sel=2&se14=1>, retrieved on Jun. 5, 2005, 1 page.

Mayor, et al., "Magnetometer Accuracy and Use," U.S. Appl. No. 13/669,403, filed Nov. 5, 2012, 20 pages.

PNI Sensor Corporation, "Calibration Computations for Practical Compassing using the PNI-11096 Magnetometer ASIC," Aug. 2008, PNI Corporation © 2001, Santa Rosa, CA, 3 pages.

Cho, et al., "A Calibration Technique for a Two-Axis Magnetic Compass in Telematics Devices," Jun. 2005, ETRI Journal, 27(3):280-288.

Westerberg, "Compass Go," Apple Apps Store, Oct. 10, 2008, 3 pages.

Zhang and Gao, "A Novel Auto-calibration Method of the Vector Magnetometer," Ninth Intl Conf on Electronic Measurement & Instruments, ICEMI 2009, pp. 1-145 through 1-150.

\* cited by examiner

STATE ESTIMATION USING MOTION CONTEXT AND MULTIPLE INPUT OBSERVATION TYPES

TECHNICAL FIELD

This disclosure relates generally to state estimation for mobile devices.

BACKGROUND

Modern mobile devices, such as smart phones and electronic tablets, incorporate various technologies that can provide position-velocity (PV) measurements of the mobile device. Integrating these multiple PV measurements to compute a minimum error estimate of PV requires a new state estimator design.

SUMMARY

Techniques for estimating the current state (e.g., position, velocity) of a mobile device based on motion context and multiple input observation types are disclosed. In some implementations, an Extended Kalman Filter (EKF) formulation is used to combine multiple input observations received from a variety of sources (e.g., WiFi, cell, GPS) to compute a minimum error state estimate. In some implementations, the EKF is updated using position estimates from an active cell and/or a candidate active cell during cell-hopping events.

Particular implementations of the disclosed implementations provide one or more of the following advantages: 1) an ability to provide a PV estimate on demand with an uncertainty growth model; 2) an ability to optimally combine a priori state information with a current update; 3) an ability to combine multiple PV updates from multiple sources; 4) an ability to use motion context to set the filter dynamic model to control uncertainty growth; 5) an ability to perform zero-velocity updates based on motion context; 6) an ability to prevent large changes in PV from inputs that are outliers; and 7) an ability to provide speed and direction of travel estimates from position only inputs.

The details of one or more disclosed implementations are set forth in the accompanying drawings and the description below. Other features, aspects, and advantages will become apparent from the description, the drawings and the claims.

BRIEF DESCRIPTION OF THE DRAWINGS

Like reference symbols in the various drawings indicate like elements.

DETAILED DESCRIPTION

State Estimation System Overview

Figure 1:
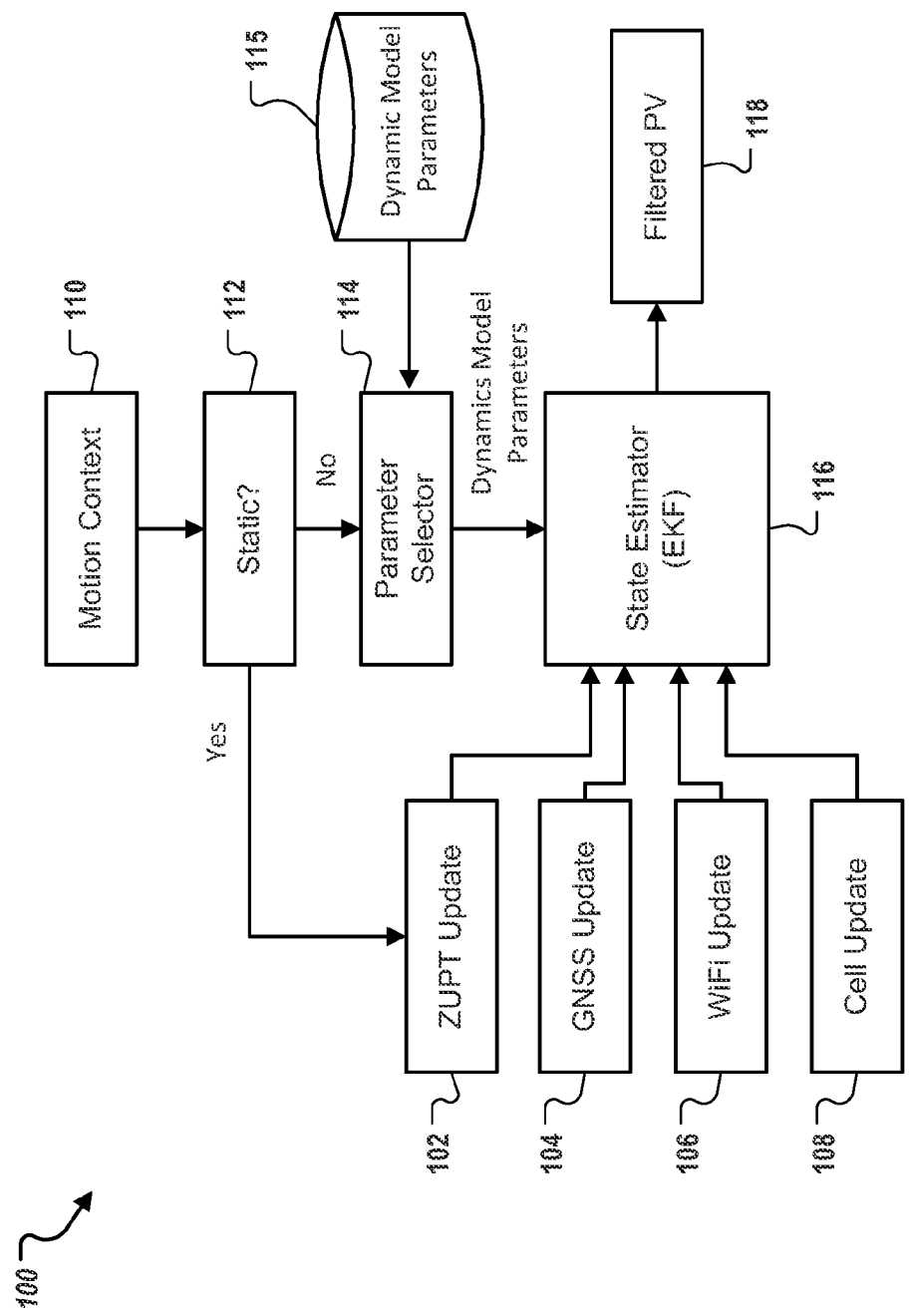
FIG. 1 is a block diagram of an exemplary state estimation system for a mobile device that uses motion context and multiple observation types to compute state estimates for the mobile device.

FIG. 1 is a block diagram of an exemplary state estimation system 100 for a mobile device that uses motion context and multiple observation types to compute state estimates for the mobile device. In some implementations, system 100 can include zero-velocity update (ZUPT) module 102, GNSS update module 104, WiFi update module 106, cell update module 108, parameter selector 114 and state estimator 116. The mobile device can be any location-aware device capable of computing state estimates based on input observations, including but not limited to: smartphones, electronic tablets, gaming devices, e-mail or text messaging devices, portable computers, vehicle navigation systems and the like.

System 100 can be implemented in software (e.g., in an operating system or library) as a location resource for client applications running on the mobile device. In such a configuration, applications can request location updates from system 100 through an exposed Application Programming Interface (API). The location updates can include computing PV estimates. The processes for computing the PV estimates can be transparent to the applications requesting the location updates.

GNSS update module 104 can include a Global Positioning Receiver (GPS) that provides PV estimates for the mobile device using satellites. Since GPS PV information may have already been filtered in the GPS receiver or elsewhere, the GPS PV information can be used to initialize the state estimator 116.

WiFi update 106 can be a process implemented in software that provides position estimates for the mobile device based on signal measurements and information received from wireless network access points (e.g., WiFi routers) observed by the mobile device. These signal measurements and information can be compared with reference signal measurements and information stored in a database on the mobile device or on a network to determine the position estimate of the mobile device.

Cell measurement module 108 can be a process implemented in software that computes a position estimate of the mobile device based on cell towers of a cellular network using, for example, cell-of-origin (COO) techniques that consider the unique identifiers of base stations and in some cases their locations to compute a position estimate for the mobile device. In practice, a network carrier offering location services to third parties can present an API to which queries can be sent by validated users. A reply to the queries can include the center of a circle and a radius representing an expected error or the size of the circle in which the mobile device is expected to be.

ZUPT update module 102 can be a process implemented in software that provides zero-velocity updates to state estimator 116, which can be derived from 3-axis accelerometer sensors onboard the mobile device.

In some implementations, motion context 110 can be determined by measurements provided by onboard sensors (e.g., accelerometer, gyro sensors). Motion context 110 can be static or dynamic. If the mobile context 110 is static, then ZUPT update module 102 can provide a zero-velocity update to state estimator 116. If the mobile context 110 is dynamic, then a motion type can be determined and dynamic model parameters specific to the motion type can be selected (or computed) by parameter selector 114. The parameters can be used to adjust the growth of uncertainty of the state estimates computed by state estimator 116. For example, accelerometer measurements can be used to determine the speed of the mobile device, which can be compared to a threshold speed value to determine a motion type. Some examples of motion types include walking, running or riding in a car or other vehicle.

The appropriate dynamic model parameters can be selected (or computed) by parameter selector 114 for the determined motion type and sent to state estimator 116. State estimator 116 can use the selected parameters to update a dynamic model in state estimator 116, such as updating a process noise matrix Q of the EKF defined in Table I below. The dynamic model parameters can be pre-computed and stored in database 115 on the mobile device or made accessible through a network connection (stored in the "cloud").

In some implementations, state estimator 116 can be a process implemented in software and/or hardware that integrates multiple input observations and motion context to compute a filtered state 118 using knowledge of the mobile device system and measurement dynamics, assumed statistics of system noises and measurement noises, and initial condition information.

In the examples that follow, state estimator 116 is a sequential, discrete-time EKF. The EKF is an efficient (unbiased and minimum variance) recursive filter that estimates the error states of a dynamic system, such as the position and velocity of the mobile device.

Table I below provides a summary of equations for the sequential discrete-time EKF.

TABLE I

Discrete-time sequential EKF equations

Function Model (linearized form)
$z_i = h_i \hat{\delta}_x$
Measurement Model
$v_i = z_i + \epsilon_i = l_i - \hat{l}_i$ $\hat{\delta}_x$: error state vector
$h_i$: $i^{th}$ design vector
$v_i$: $i^{th}$ measurement innovation
$l_i - \hat{l}_i$: measured minus estimated value
$\epsilon_i$: measurement noise Dynamics (from epoch k – 1 to k)
$\hat{x}_k = \Phi_{k-1} \hat{x}_{k-1} + w_{k-1}$ $\hat{x}_k$: vector of unknown parameters
$\Phi_{k-1,k}$: state transition matrix
$w_{k-1}$: white noise sequence
$Q_k$: process noise matrix.
Allows sequential processing Stochastic Model
$n\epsilon_i \sim N(0, \sigma_i^2)$, normally distributed
$E[\epsilon_i \epsilon_j] = 0$, independent measurements
$E[\epsilon_k \epsilon_{k-1}] = 0$, not correlated in time
$w_k \sim N(0, Q_k)$, driven by white noise
$E[w_k w_{k-1}^T] = 0$, not correlated in time
$E[w_k \epsilon_i] = 0 \ \forall \ k, i$, independence assumption Initial Conditions $E[x_o] = \hat{x}_0$
$E[\hat{x}_0 \hat{x}_0^T] = P_0$
Covariance Prediction
$P_k^- = \Phi_{k-1} P_{k-1}^+ \Phi_{k-1}^T + Q_{k-1}$
State Update – superscript means pre-update
+ superscript means post-update
$k_i$: Kalman gain vector TABLE I-continued Discrete-time sequential EKF equations $\hat{\delta}_{x_{k_i}}^- = 0$ $\hat{\delta}_{x_{k_i}}^+ = k_i v_i$ $\hat{x}_{k_i}^+ = \hat{x}_{k_i}^- + \hat{\delta}_{x_{k_i}}^+$ Kalman Gain $k_i = P_{k_i}^- h_i^T \dfrac{1}{\sigma_{v_i}^2}$ $\sigma_{v_i}^2 = h_i P_k^- h_i^T + \sigma_i^2$
Covariance Update
$P_{k_i}^+ = [1 - k_i h_i] P_{k_i}^-$ scalar inversion $\sigma_{v_i}^2$: variance of the innovation (computationally efficient).

performed sequentially

Table II below defines EKF notation that will be used in the description that follows the tables.

TABLE II

EKF Notations

| | |
|---|---|
| $\phi_i$ | $i^{th}$ geodetic latitude measurement |
| $\lambda_i$ | $i^{th}$ geodetic longitude measurement |
| $\hat{\phi}$ | filtered estimate of geodetic latitude |
| $\hat{\lambda}$ | filtered estimate of geodetic longitude |
| R | measurement variance-covariance matrix |
| $v_{N_i}$ | $i^{th}$ northing-velocity (geodetic local-level frame) measurement |
| $v_{E_i}$ | $i^{th}$ easting-velocity (geodetic local-level frame) measurement |
| $\hat{v}_N$ | filtered northing-velocity |
| $\hat{v}_E$ | filtered easting-velocity |

EKF Update Overview

Figure 2:
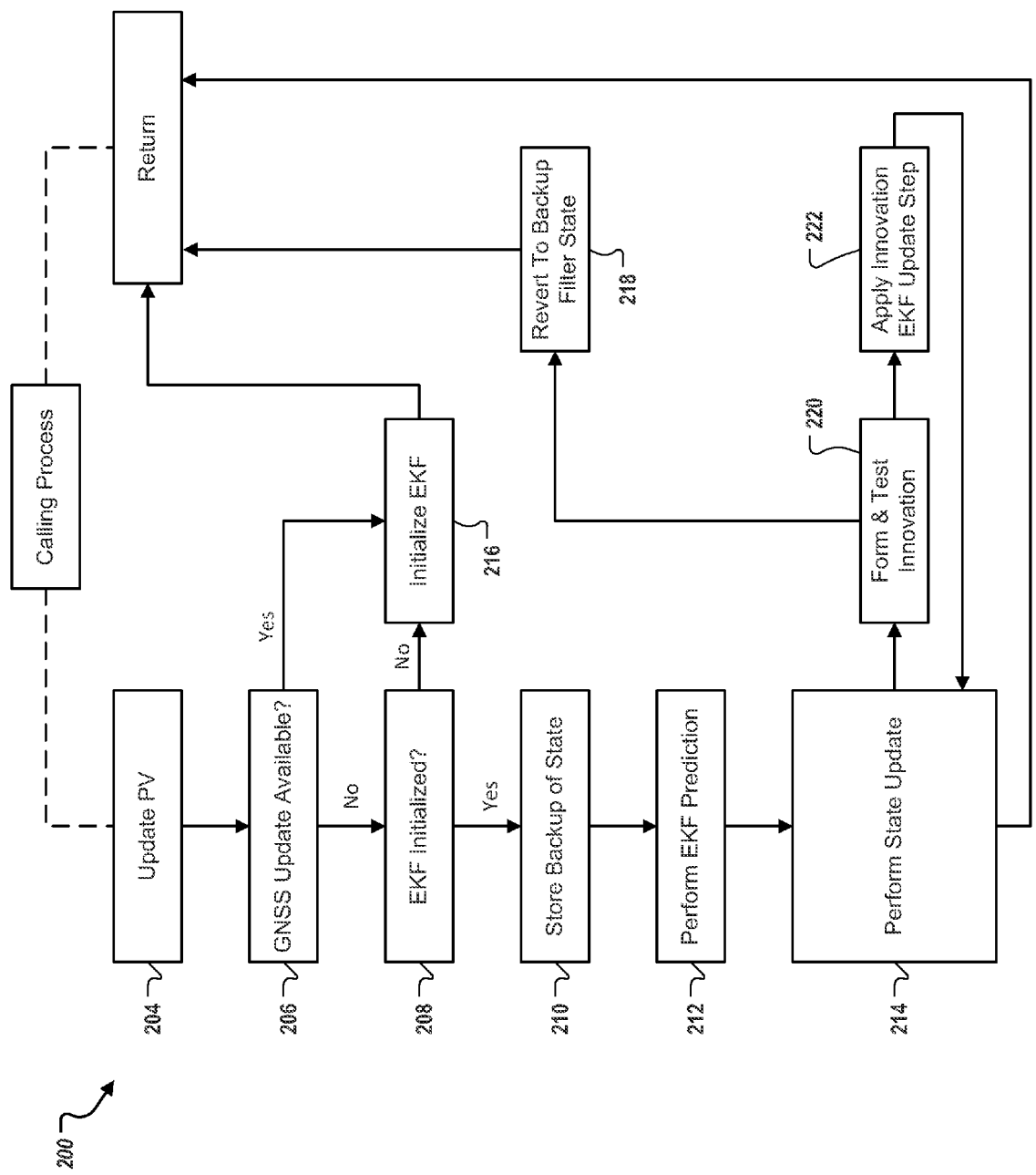
FIG. 2 is a block diagram of an exemplary EKF update process for the estimation system of FIG. 1.

FIG. 2 is a block diagram of an exemplary EKF update process 202 for the estimation system 100 of FIG. 1. In some implementations, process 200 can begin when a calling process calls a state update function 204. In this implementation, state estimator 116 is a sequential EKF that is implemented using the assumptions and equations described in Table I. In this example, the state vector to be estimated includes geodetic latitude, geodetic longitude and velocity North and velocity East, measured in a geodetic, local-level frame, such as North East Up (NEU) coordinates.

Process 200 continues by checking to see if a GNSS update is available from GNSS update module 108. If a GNSS update is available, process 200 initializes the EKF 216 with the GNSS update by specifying initial values for the initial state vector $x_0$ and initial variance-covariance matrix $P_0$ of the EKF. If a GNSS update is not available, and the EKF is not initialized 208, then the EKF can be initialized 216 using the last known state vector x and variance-covariance matrix P or some other initialization parameters that can be pre-computed and stored in, for example, database 115. Process 200 then returns to the calling process.

Once the EKF is initialized, a backup of the state can be stored (210) in database 115 and an EKF prediction step can be performed (212) using the prediction equations described in Table I. After the prediction step, the state vector estimate can be updated (214) using the update equations disclosed in Table I.

In some implementations, a measurement innovation $v_i$ is formed and tested (220) against a threshold or an acceptable measurement range to ensure that the measurement is not erroneous. Such an outlier observation can cause the EKF to diverge from a minimum variance state estimate. The measurement innovation can be obtained from one of WiFi update module 106 or cell update module 108. If the measurement innovation is below the threshold or within the acceptable measurement range, the measurement innovation can be applied in the EKF update step (214). If the measurement innovation is above the threshold or outside the acceptable measurement range, process 200 reverts back to the backup EKF state (218), and returns to the calling process.

Motion Context Update

Figure 3A:
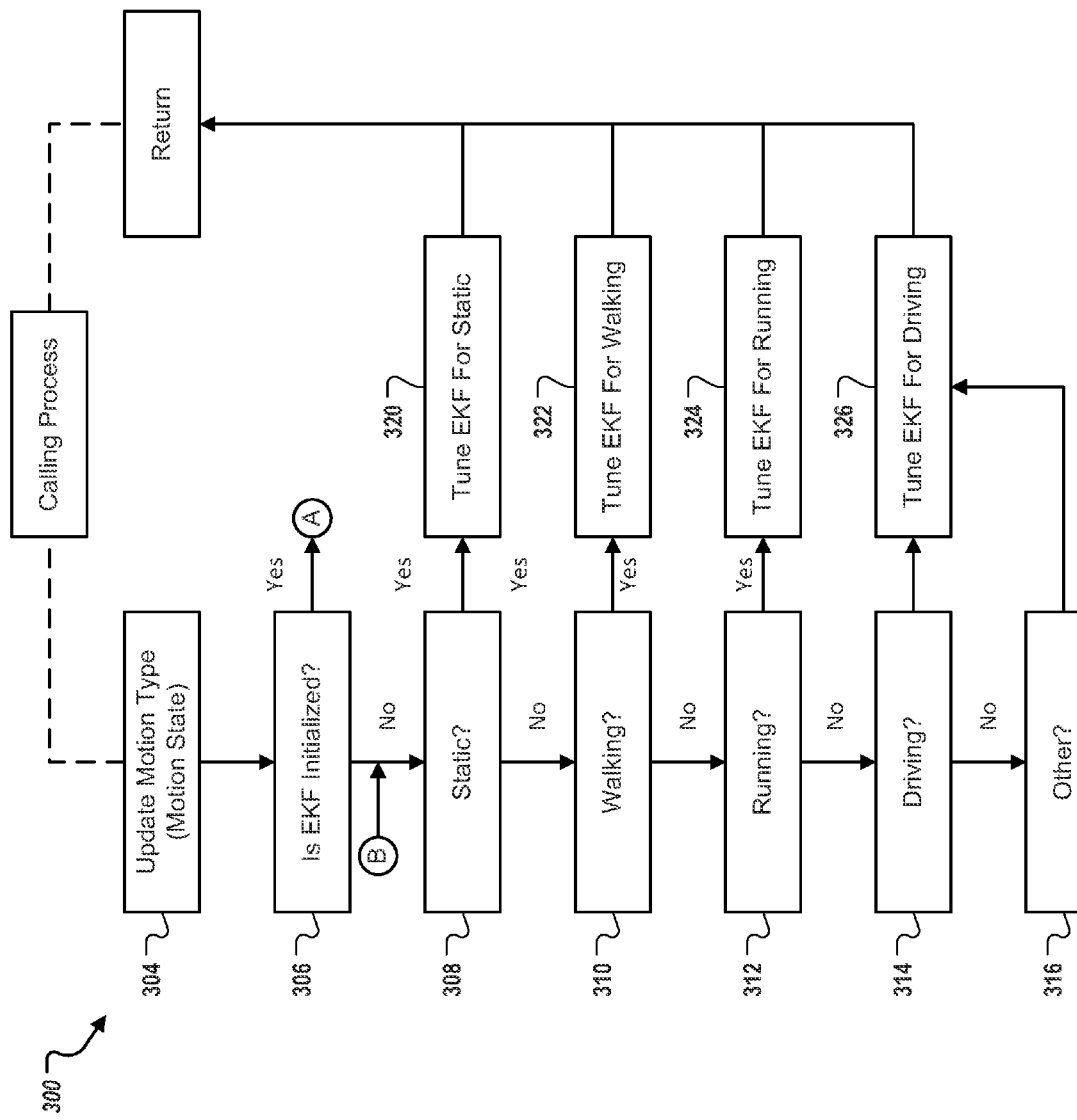
FIG. 3A is a flow diagram of an exemplary motion update process for the estimation system of FIG. 1, where the EKF is uninitialized.

FIG. 3A is a flow diagram of an exemplary motion update process 300 for the estimation system 100 of FIG. 1, where the EKF is uninitialized. Process 300 can begin when a calling process updates its motion type (304) based on motion context 110 of the mobile device.

If the EKF is uninitialized (306), then process 300 determines whether motion context 110 is static (308). If static, process 300 tunes (320) the EKF for static dynamics. For example, parameter selector 114 (FIG. 1) can select the appropriate pre-computed dynamic model parameters for a static mobile device. Such parameters can be used to replace or derive elements of a process noise matrix Q of the EKF. For example, the parameters can be selected to have a slower growth of uncertainty on the EKF estimates of PV.

Likewise, if process 300 determines motion context 110 to be dynamic, then process 300 determines a motion type, such as walking 310, running 312, driving 314 or other motion type 316. Process 300 can then tune the EKF for walking (322), running (324) or driving (326). In some implementations, motion context 110 and the motion type can be determined by the sensed speed of the mobile device derived from accelerometer sensor readings. After motion type is determined and the EKF is tuned for the determined motion type, process 300 returns to the calling process.

Figure 3B:
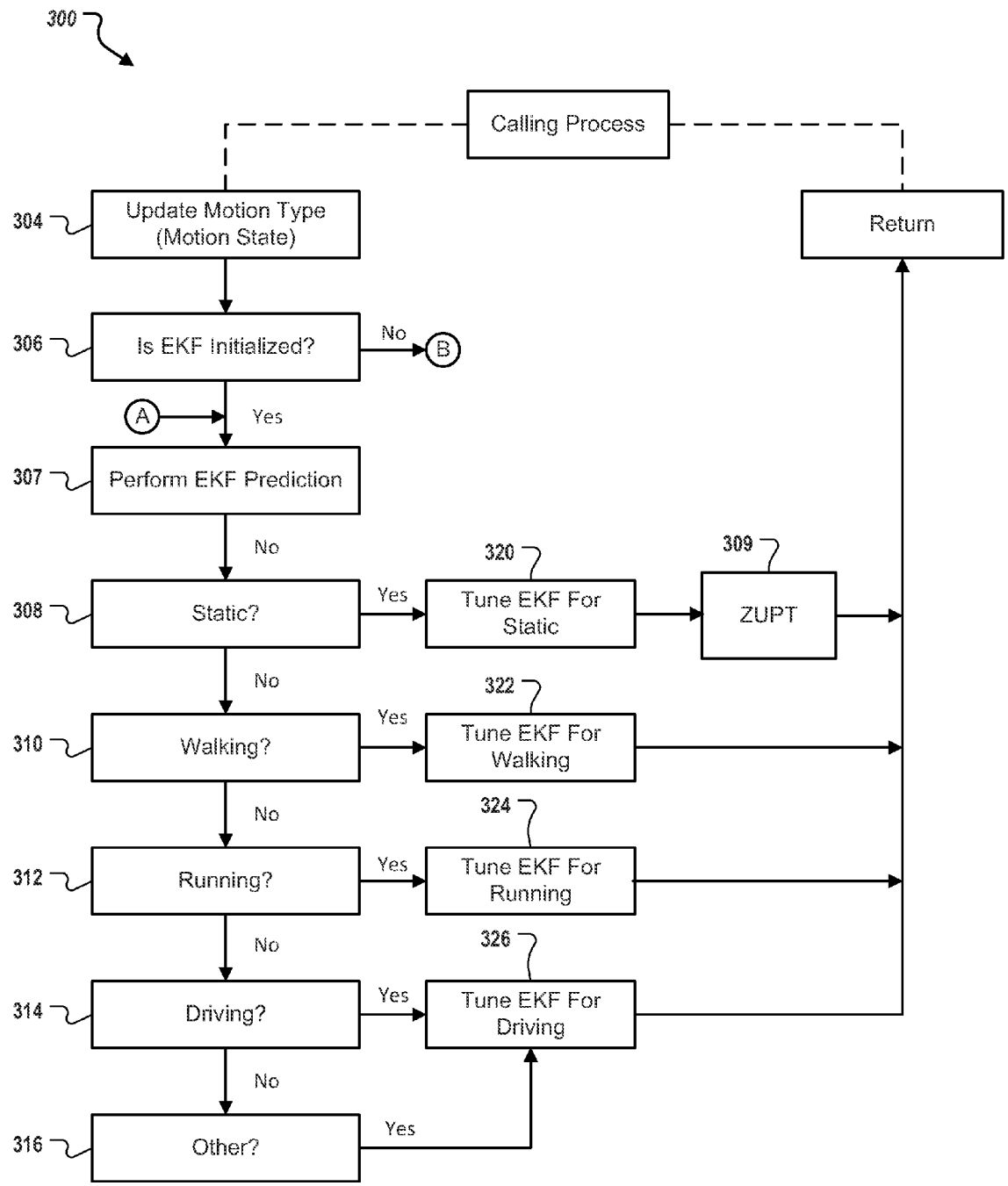
FIG. 3B is a block diagram of an exemplary motion update process for the estimation system of FIG. 1, where the EKF is initialized.

FIG. 3B is a block diagram of an exemplary motion update process 300 for the estimation system 100 of FIG. 1, where the EKF is initialized. Process 300 can begin when a calling process updates its motion type (304).

If the EKF is initialized (306), then process 300 performs an EKF prediction step (307). Process 300 then determines whether motion context 110 is static or dynamic (308). If static, process 300 tunes (320) the EKF for static motion context and performs a zero-velocity update (309). For example, parameter selector 114 (FIG. 1) can select or compute the appropriate dynamic model parameters for a static motion context 110. Such parameters can be used to replace or derive elements of a process noise matrix Q of the EKF. The parameters can be selected to have a slower growth of uncertainty on the EKF estimates of PV.

Likewise, if process 300 determines motion context 110 to be dynamic, then process 300 determines the motion type to be walking (310), running (312), driving (314) or other motion type (316). Process 300 then tunes the EKF for the determined one of walking (322), running (324) or driving (326). In some implementations, the motion type can be determined by the sensed speed of the mobile device taken from accelerometer sensor readings. After motion type is determined and the EKF is tuned for the motion type, process 300 returns to the calling process.

Zero-Velocity Update Process

Figure 4:
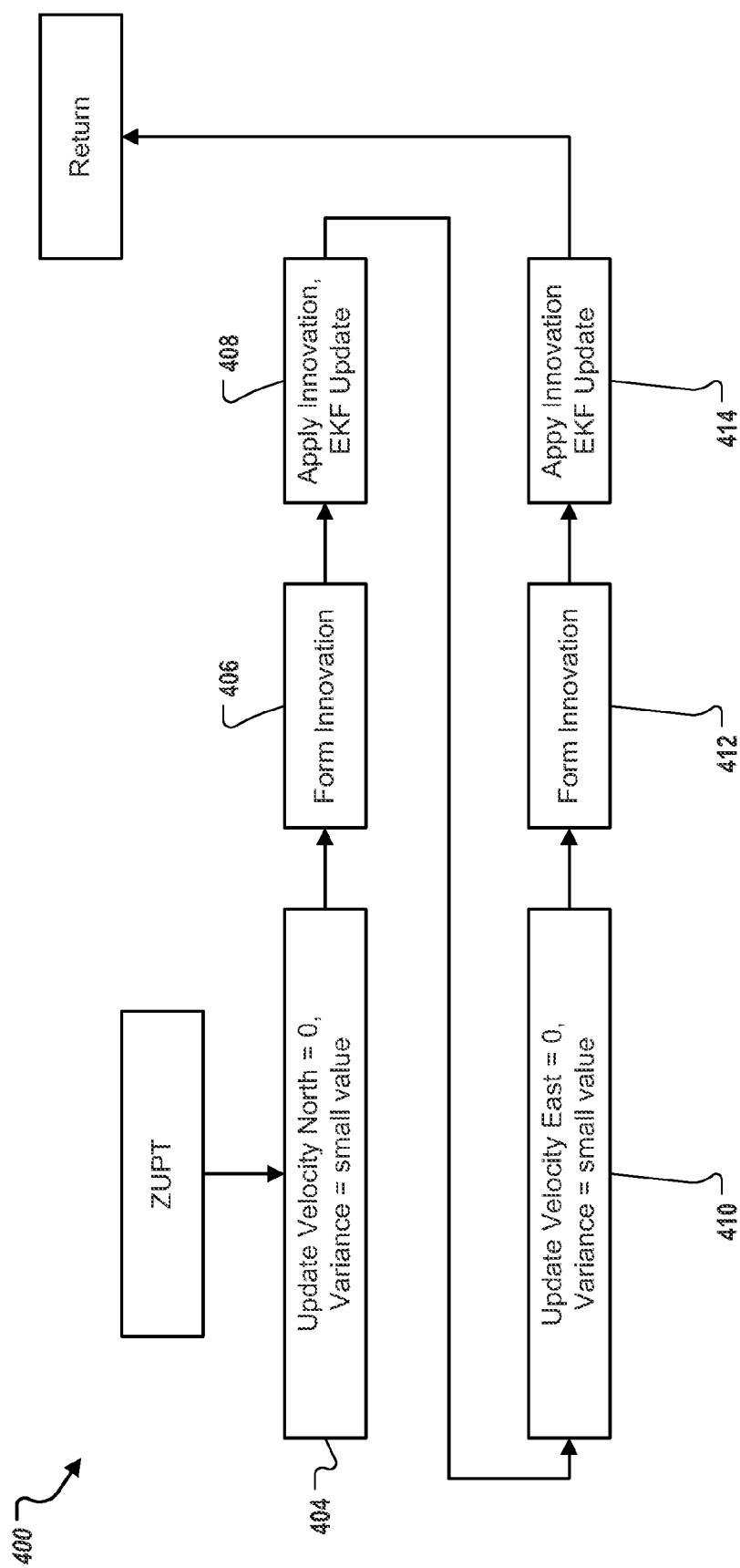
FIG. 4 is a block diagram of an exemplary EKF zero-velocity update process for the estimation system of FIG. 1.

FIG. 4 is a block diagram of an exemplary EKF zero-velocity update process 400 for the estimation system 100 of FIG. 1. Process 400 can begin by updating velocity North to zero with a small variance value (404). The small variance value can be used to model the measurement noise. A measurement innovation is formed (406) and applied to the EKF update (408). Similarly, velocity East is updated to zero with a small variance (410) that can be used to model the measurement noise. A measurement innovation is formed (412) and applied to the EKF update (414). Although zero-velocity updates are shown as occurring in series for North and East velocities, the updates can also occur in parallel in the EKF.

Example Functional/Measurement Model

In some implementations, GNSS, WiFi-derived and cell-derived position and velocity inputs can be linearly mapped to the EKF states, which includes geodetic latitude and longitude and North and East velocities. Accordingly the following observations can be used as inputs to the EKF:

GNSS position and velocity

WiFi-derived position

Cell-derived position

Static zero velocity update (ZUPT) derived from accelerometer sensors.

The EKF is not restricted to the use of these input types and can be updated with other potential position and velocity sources. Formulations for measurement innovations and measurement noise for each of these input types will now be described with reference to Tables I and II.

The cell-derived position measurement update can be formulated as $$z_{cell} = \begin{bmatrix} \phi_i \\ \lambda_i \\ 0 \\ 0 \end{bmatrix} - \begin{bmatrix} \hat{\phi} \\ \hat{\lambda} \\ 0 \\ 0 \end{bmatrix}, \tag{1}$$

$$h_{[1,4]} = [\,1 \quad 1 \quad 0 \quad 0\,], \tag{2}$$

$$R_{cell} = \begin{bmatrix} \sigma_N^2 & 0 & 0 & 0 \\ 0 & \sigma_E^2 & 0 & 0 \\ 0 & 0 & 0 & 0 \\ 0 & 0 & 0 & 0 \end{bmatrix}. \tag{3}$$

The WiFi-derived position measurement update can be formulated as $$z_{WiFi} = \begin{bmatrix} \phi_i \\ \lambda_i \\ 0 \\ 0 \end{bmatrix} - \begin{bmatrix} \hat{\phi} \\ \hat{\lambda} \\ 0 \\ 0 \end{bmatrix}, \tag{4}$$

$$h_{[1,4]} = [\,1 \quad 1 \quad 0 \quad 0\,], \tag{5}$$

$$R_{WiFi} = \begin{bmatrix} \sigma_N^2 & 0 & 0 & 0 \\ 0 & \sigma_E^2 & 0 & 0 \\ 0 & 0 & 0 & 0 \\ 0 & 0 & 0 & 0 \end{bmatrix}. \tag{6}$$

The GNSS position and velocity measurement update can be formulated as $$z_{GPS} = \begin{bmatrix} \phi_i \\ \lambda_i \\ v_{Ni} \\ v_{Ei} \end{bmatrix} - \begin{bmatrix} \hat{\phi} \\ \hat{\lambda} \\ \hat{v}_N \\ \hat{v}_E \end{bmatrix}, \quad (7)$$

$$h_{[1,4]} = [\,1 \ \ 1 \ \ 1 \ \ 1\,], \quad (8)$$

$$R_{GPS} = \begin{bmatrix} \sigma_N^2 & 0 & 0 & 0 \\ 0 & \sigma_E^2 & 0 & 0 \\ 0 & 0 & \sigma_{vN}^2 & 0 \\ 0 & 0 & 0 & \sigma_{vE}^2 \end{bmatrix}. \quad (9)$$

If the GNSS PV updates have been filtered by the GNSS receiver or in a hybrid system that includes inertial sensors and in some cases cell-derived and WiFi-derived positions, further filtering of the GNSS PV updates using the disclosed EKF may not be desirable. For these cases, GNSS PV information can be used as a "seed" to the EKF by setting the initial EKF conditions for further filtering with WiFi-derived and cell-derived position sources.

The zero-velocity update (ZUPT) can be formulated as $$z_{ZUPT} = \begin{bmatrix} 0 \\ 0 \\ 0 \\ 0 \end{bmatrix} - \begin{bmatrix} 0 \\ 0 \\ \hat{v}_N \\ \hat{v}_E \end{bmatrix}, \quad (10)$$

$$h_{[1,4]} = [\,0 \ \ 0 \ \ 1 \ \ 1\,], \quad (11)$$

$$R_{ZUPT} = \begin{bmatrix} 0 & 0 & 0 & 0 \\ 0 & 0 & 0 & 0 \\ 0 & 0 & \sigma_{vN}^2 & 0 \\ 0 & 0 & 0 & \sigma_{vE}^2 \end{bmatrix}, \quad (12)$$

where $\sigma_{vN}^2$ and $\sigma_{vE}^2$ have small values.

Example State Vector

The unknown states estimated by the EKF are $$x = \begin{bmatrix} \phi \\ \lambda \\ v_N \\ v_E \end{bmatrix}, \quad (13)$$

where $\phi$ is latitude (radians), $\lambda$ is longitude (radians), $v_N$ is velocity North in m/s and $v_E$ is velocity East in m/s.

Example States Variance-Covariance Matrix

The variance-covariance matrix of the states (13) is expressed in terms of meters (not radians) for the position states and in terms of meters per second for the velocity states (using geodetic local-level coordinate frame). The states variance-covariance matrix can be given by $$P = \begin{bmatrix} \sigma_N^2 & \sigma_{NE} & \sigma_{NvN} & \sigma_{NvE} \\ \sigma_{NE} & \sigma_E^2 & \sigma_{EvN} & \sigma_{EvE} \\ \sigma_{NvN} & \sigma_{EvN} & \sigma_{vN}^2 & \sigma_{vNvE} \\ \sigma_{NvE} & \sigma_{EvE} & \sigma_{vNvE} & \sigma_{vE}^2 \end{bmatrix}, \quad (14)$$

$$P_0 = \begin{bmatrix} \sigma_N^2 & 0 & 0 & 0 \\ 0 & \sigma_E^2 & 0 & 0 \\ 0 & 0 & \sigma_{vN}^2 & 0 \\ 0 & 0 & 0 & \sigma_{vE}^2 \end{bmatrix}. \quad (15)$$

Example State Space Discrete System Model

In some implementations, the state perturbations can be given by $$\delta_{x\phi\lambda} = \begin{bmatrix} \delta_\phi \\ \delta_\lambda \\ \delta_{vN} \\ \delta_{vE} \end{bmatrix}, \quad (16)$$

where $\delta_\phi$ is change in latitude in radians, and $\delta_\lambda$ is change in longitude in radians, $\delta_{vN}$ is change in Northing velocity and $\delta_{vE}$ is change in Easting velocity. The state perturbations can be modeled more simply as changes in state in a local-level coordinate frame (i.e., change in Easting and changing Northing) given by $$\delta_x = \begin{bmatrix} \delta_N \\ \delta_E \\ \delta_{vN} \\ \delta_{vE} \end{bmatrix}, \quad (17)$$

where $\delta_N$ is change in Northing and $\delta_E$ is change in Easting. The state error update equation of the EKF is then given by $$x_k^+ = x_k^- + \delta_x = x_k^- + \begin{bmatrix} \dfrac{\delta N}{(M+h)} \\ \dfrac{\delta E}{((N+h)\cos(\phi))} \\ \delta_{vN} \\ \delta_{vE} \end{bmatrix}, \quad (18)$$

where h is ellipsoidal height, M is the meridian radius of curvature and N is the prime vertical radius of curvature.

The meridian radius of curvature (for WGS84) is calculated by:

$$M = a(1-e^2)/W, \quad (19)$$

where $$a = 6378137.0, \quad (20)$$

$$e^2 = 0.00669437999014132,$$

$$W = \sqrt{1 - e^2 \sin^2(\phi)}. \quad (21)$$

The prime vertical radius of curvature is calculated by:

$$N = a/W.  \quad (22)$$

Example State Space Discrete System Model

In some implementations, the state space discrete system model is given by $$x_{k+1} = \Phi x_k + w_k, \quad (23)$$

$$\Phi = \begin{bmatrix} 1 & 0 & \frac{1}{(M+h)}\frac{1}{\beta_v}(1-e^{-\beta_v \Delta t}) & 0 \\ 0 & 1 & 0 & \frac{1}{((N+h)\cos(\phi))}\frac{1}{\beta_v}(1-e^{-\beta_v \Delta t}) \\ 0 & 0 & e^{-\beta_v \Delta t} & 0 \\ 0 & 0 & 0 & e^{-\beta_v \Delta t} \end{bmatrix}, \quad (24)$$

$$x_{k+1} = \begin{bmatrix} \phi \\ \lambda \\ vN \\ vE \end{bmatrix}_{k+1} = \begin{bmatrix} 1 & 0 & \frac{1}{(M+h)}\frac{1}{\beta_v}(1-e^{-\beta_v \Delta t}) & 0 \\ 0 & 1 & 0 & \frac{1}{((N+h)\cos(\phi))}\frac{1}{\beta_v}(1-e^{-\beta_v \Delta t}) \\ 0 & 0 & e^{-\beta_v \Delta t} & 0 \\ 0 & 0 & 0 & e^{-\beta_v \Delta t} \end{bmatrix} \begin{bmatrix} \phi \\ \lambda \\ vN \\ vE \end{bmatrix}_k + w_k, \quad (25)$$

where $\beta_v$ is the inverse of the correlation time and $\Phi$ is a state transition matrix.

Example PV Scalar Dynamic model

Figure 5:
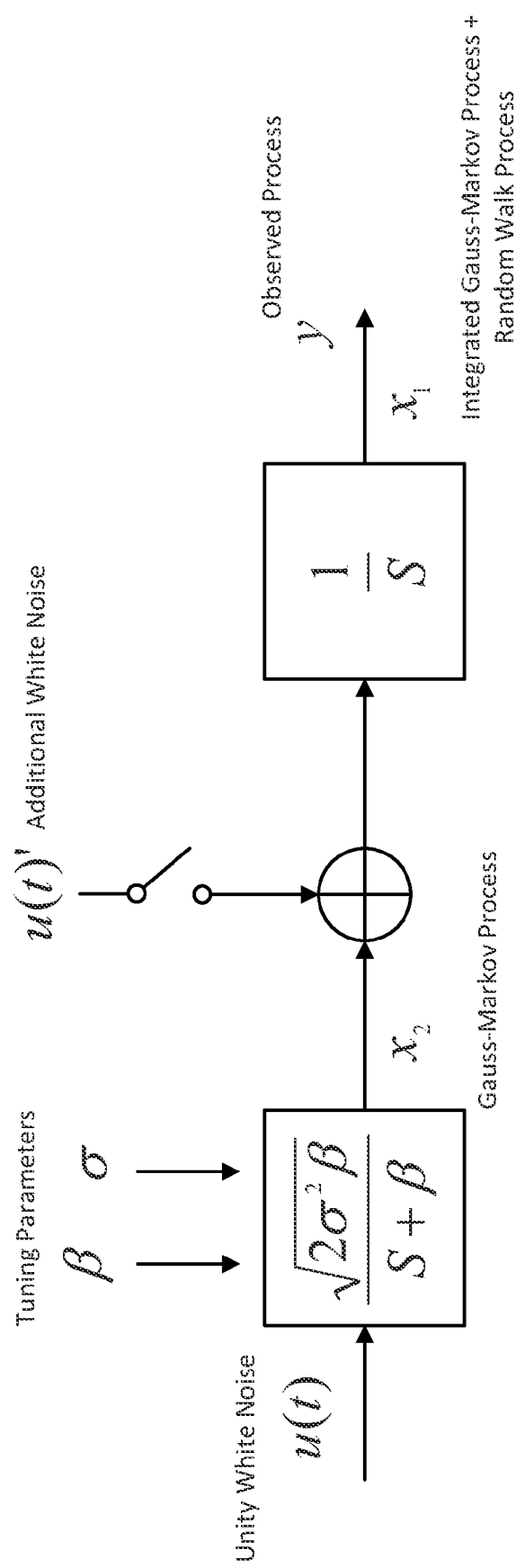
FIG. 5 is a block diagram illustrating an exemplary scalar position-velocity model used by the system of FIG. 1.

FIG. 5 is a block diagram illustrating an exemplary scalar position-velocity model used by the system 100 of FIG. 1. As discussed in reference to FIGS. 1-4, the EKF makes use of PV measurements from GNSS, WiFi-derived and cell-derived sources as well as knowledge of the motion context of the device. In some implementations, motion context can include the motion types: static, walking, running and driving. Motion context can be determined using 3-axis accelerometer sensor data and other available system information. The EKF prediction step makes use of the motion context to tune the dynamic model used for the prediction of the unknown states (e.g., position, velocity) and the associated state covariance matrix P.

It is desired to make use of short-term velocity propagation if this is known (e.g., from GNSS velocity or derived from a number of consecutive position updates). For example, if the user is traveling North on a freeway at 100 km/hour based on a filter update, it is likely that the user is still traveling quickly a few seconds later. Thus, the dynamic model used by the EKF allows for short-term velocity propagation. After $\Delta T_{rw}$ seconds elapsed time without a PV update, additional process noise (e.g., random walk) corresponding to the position states can be added if the motion state is not static. The magnitude of the additional random walk noise depends on the motion type. Less random walk noise is added for walking compared to driving, for example.

FIG. 5 is a block diagram of a distance-speed difference model for a single dimension case is shown in state space. The model allows short-term, linear dead reckoning and long-term uncertainty growth. In this model, the velocity state is a first order Gauss-Markov process and the position state is an integrated Gauss-Markov process. After $\Delta T_{rw}$ seconds, additional process noise u(t)' is added to the position states. The magnitude of the additional process noise is a function of the motion context. For example, in the event the EKF gets a high reliability static indication for the motion context, the process noise and the inverse of the correlation time $\beta$ can be quickly adapted to alter the EKF behavior for the indicated motion context. A static indication can also be a zero-velocity update (ZUPT) to the EKF. For example, for $\sigma_v$=20 m/s, the speed trends to zero based on the value of $\beta$. A larger $\beta$ provides a faster rate of convergence. The propagated distance eventually reaches an asymptotic maximum value. The speed uncertainty values asymptotically approach $\sigma_v$ while the distance uncertainty growth is unbounded.

Example Process Noise Matrix

Based on the scalar PV dynamic model, the process noise matrix for the EKF can be given by $$Q_k = \begin{bmatrix} q_{11} & 0 & q_{13} & 0 \\ 0 & q_{22} & 0 & q_{24} \\ q_{31} & 0 & q_{33} & 0 \\ 0 & q_{42} & 0 & q_{44} \end{bmatrix}, \quad (26)$$

where $$q_{11} = \frac{q_v}{\beta_v^2}\left(\Delta t - \frac{2}{\beta_v}(1-e^{-\beta \Delta t}) + \frac{1}{2\beta_v}(1-e^{-2\beta \Delta t})\right), \quad (27)$$

$$q_{13} = q_{31} = \frac{q_v}{\beta_v}\left(\frac{1}{\beta_v}(1-e^{-\beta \Delta t}) - \frac{1}{2\beta_v}(1-e^{-2\beta \Delta t})\right),$$

$$q_{22} = \frac{q_v}{\beta_v^2}\left(\Delta t - \frac{2}{\beta_v}(1-e^{-\beta \Delta t}) + \frac{1}{2\beta_v}(1-e^{-2\beta \Delta t})\right),$$

$$q_{24} = q_{42} = \frac{q_v}{\beta_v}\left(\frac{1}{\beta_v}(1-e^{-\beta \Delta t}) - \frac{1}{2\beta_v}(1-e^{-2\beta \Delta t})\right),$$

$$q_{33} = \frac{q_v}{2\beta_v}(1-e^{-2\beta \Delta t}),$$

$$q_{44} = \frac{q_v}{2\beta_v}(1-e^{-2\beta \Delta t}).$$

If the elapsed time since the last position update to the EKF is more than $\Delta T_{rw}$ seconds and the current motion state is not static, additional random walk process noise can be added to the process noise matrix Q given by $$Q_k = \begin{bmatrix} q_{11} + q_p & 0 & q_{13} & 0 \\ 0 & q_{22} + q_p & 0 & q_{24} \\ q_{31} & 0 & q_{33} & 0 \\ 0 & q_{42} & 0 & q_{44} \end{bmatrix}, \quad (28)$$

where $$q_p = \frac{s\Delta t}{2}, \quad (29)$$
$$s_{pedestrian} = (x)^2,$$
$$s_{other} = (\sqrt{2} * y)^2.$$

In equations (2), $q_p$ is a function of the user motion context with higher process noise for non-pedestrian motion. The variables x and y are process noise for position (in meters) for pedestrian and other motion states, respectively. For example, x=500 m and y=1000 m, to adjust the growth of uncertainty based on the speed of the user/mobile device.

Active Cells and Cell Hopping Model

When the mobile device is "camped" on a cell, the location of the user is bounded by the region of likely connection to the cell. This means that position information from a cell-derived filter solution remains active until the connection to the cell is lost. Any time the filter is propagated, for example if there is a change in motion context, the cell update can be applied. Any time, the connection to the cell is lost, for example if moving away from the cell or if the device is in sleep mode, the cell update can be applied. However, it may not be desirable to apply the cell position update often over a short time span. The information provided to the EKF should be independent and uncorrelated. If the cell updates are applied often over a short period, the filter solution will be using time-correlated observations. Thus, a decorrelation time period can be used. Effectively, cell position updates cannot be applied consecutively with the same position more than once during the decorrelation time period.

If a mobile device is switching from one active cell to another, it may not be desirable to hop form one cell location completely to the other cell location. If the concept of an active cell is applied, the filter can be updated with a prior active cell first before applying a position update from a new candidate active cell. This is intuitively correct since the first cell position is still active when the switch to the candidate active cell occurs.

In some implementations, active cell rules and assumptions can be as follows:
- Active cell is only maintained for cell inputs
- GNSS and WiFi updates cause a loss of the active cell
- System sleep loses the active cell
- Losing the active cell triggers an active cell update to the EKF
- Motion context updates trigger an active cell update because the filter must be propagated
- Repeated updates with an identical cell position are not allowed within a $\Delta_{ac}$ seconds of each other If the mobile device is camped out on cell A, then the EKF can use the cell A position update and store cell as the "active" cell for providing position updates to the EKF. If hopping occurs and cell-derived updates are available from both cell A and cell B, then the EKF can update with the position from cell A, followed by an update with the position from cell B (e.g., a neighboring cell). If the mobile device dwells within the active areas of cell A and cell B for a predetermined amount of time dT (e.g., 2 hours), then the EKF can update with the position from the active cell A; otherwise, the EKF can update with the position from cell B, followed by an update with the position from cell A.

Example State Estimation Process

Figure 6A:
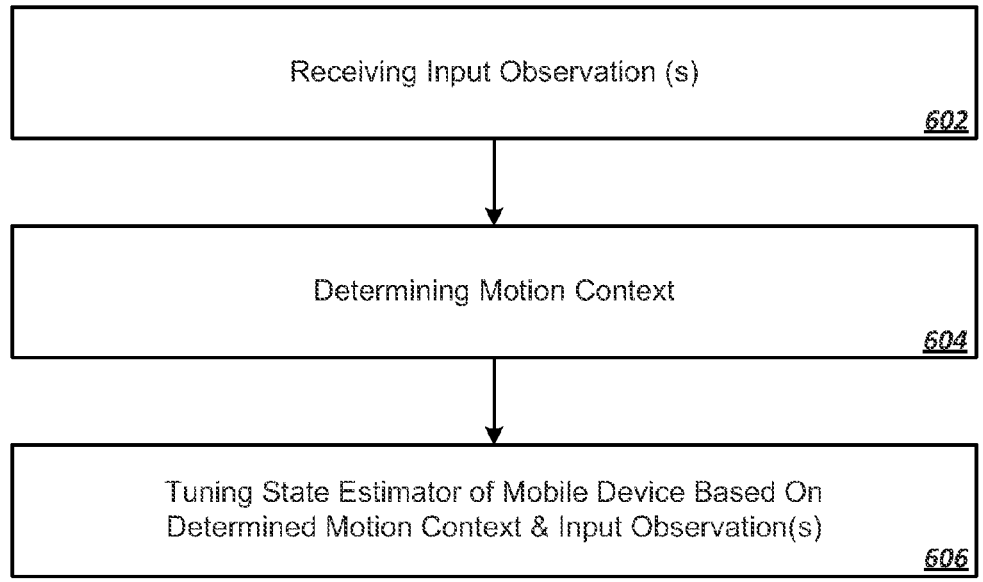
FIGS. 6A-6B are exemplary estimation processes performed by the estimation system of FIG. 1.

FIG. 6A is an exemplary estimation process 600 performed by the estimation system 100 of FIG. 1. In some implementations, process 600 can be implemented by using device architecture 800, as described in reference to FIG. 8.

Process 600 can begin by receiving one or more position observations (602). In some cases, the observations can be WiFi-derived, cell-derived, GNSS or any another source of position or velocity data.

Process 600 can continue by determining a motion context (604). For example, the motion context can be either static or moving. If moving, there can be various motion types that can be modeled. These motion types include but are not limited to walking, running and driving.

Process 600 can continue by tuning a state estimator of a mobile device based on the determined motion context and the one or more input observation (606). The state estimator can be an EKF and the tuning can include selecting/computing dynamic model parameters derived for the static motion context and the various motion types in the dynamic motion context. For example, tuning can include adjusting the elements of a process noise matrix Q of an EKF based on a PV dynamic model that adds additional process noise (e.g., random walk noise) to position states in Q to control the growth of uncertainty in the position estimates provided by the EKF solution.

Figure 6B:
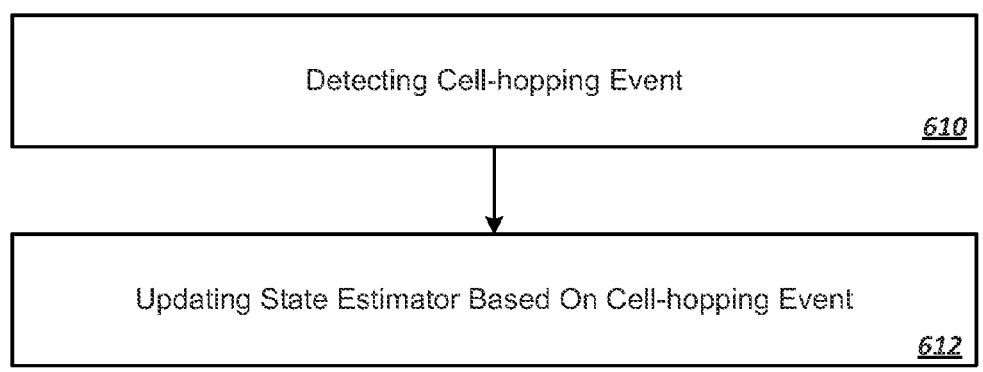

FIG. 6B is an exemplary estimation process 608 performed by the estimation system 100 of FIG. 1. Process 608 can begin by detecting a cell-hopping event (610). A cell-hopping event can occur when the mobile device is moving from an active cell to a candidate active cell.

Process 608 can continue by updating the state estimator of a mobile device based on the cell-hopping event (612). For example, when transitioning from active cell A to candidate active cell B during a cell-hopping event the following logic can be employed:

---
A is the active cell which last updated the EKF at t0
B is the candidate cell update at time t0+dT
if( dT > dwellTimeThreshold )
    UpdateEKF with A then B
else
    UpdateEKF with B

---

The threshold dT for the change in time is to protect against adding the same cell update repeatedly and biasing the filter.

Exemplary Operating Environment

Figure 7:
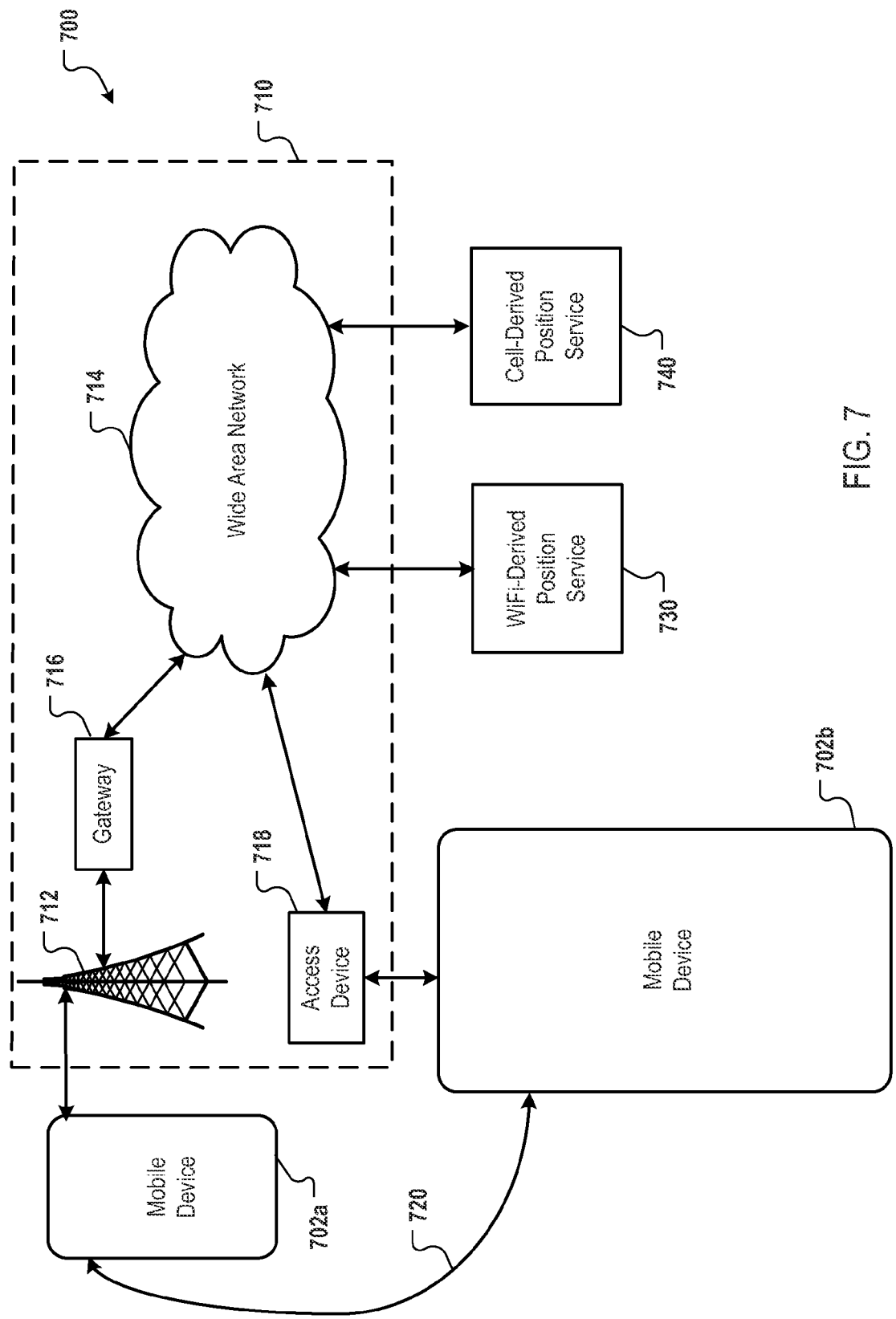
FIG. 7 illustrates an exemplary operating environment for a mobile device that implements the estimation system of FIG. 1.

FIG. 7 illustrates an exemplary operating environment 700 for a mobile device that implements the estimation system 100 of FIG. 1. In some implementations, mobile devices 702a and 702b can for example, communicate over one or more wired and/or wireless networks 710 in data communication. For example, a wireless network 712, e.g., a cellular network, can communicate with a wide area network (WAN) 714, such as the Internet, by use of a gateway 716. Likewise, an access device 718, such as an 802.11g wireless access device, can provide communication access to the wide area network 1214.

In some implementations, both voice and data communications can be established over wireless network 712 and the access device 718. For example, mobile device 702a can place and receive phone calls (e.g., using voice over Internet Protocol (VoIP) protocols), send and receive e-mail messages (e.g., using Post Office Protocol 3 (POP3)), and retrieve electronic documents and/or streams, such as web pages, photographs, and videos, over wireless network 712, gateway 716, and wide area network 714 (e.g., using Transmission Control Protocol/Internet Protocol (TCP/IP) or User Datagram Protocol (UDP)). Likewise, in some implementations, the mobile device 702b can place and receive phone calls, send and receive e-mail messages, and retrieve electronic documents over the access device 718 and the wide area network 714. In some implementations, mobile device 702a or 702b can be physically connected to the access device 718 using one or more cables and the access device 718 can be a personal computer. In this configuration, mobile device 702a or 702b can be referred to as a "tethered" device.

Mobile devices 702a and 702b can also establish communications by other means. For example, wireless mobile device 702a can communicate with other wireless devices, e.g., other mobile devices 702a or 702b, cell phones, etc., over the wireless network 712. Likewise, mobile devices 702a and 702b can establish peer-to-peer communications 720, e.g., a personal area network, by use of one or more communication subsystems, such as the Bluetooth™ communication devices. Other communication protocols and topologies can also be implemented.

The mobile devices 702a or 702b can for example, communicate with one or more services 730 and 740 over the one or more wired and/or wireless networks. For example, a cell-derived position update service 730 (e.g., a wireless network carrier) can provide mobile devices 702a, 702b with cell-derived position updates and WiFi-derived position update service 740 (e.g., an Internet service) can provide mobile devices 702, 702b with WiFi-derived position updates, as described in reference to FIGS. 1-6.

Mobile device 702a or 702b can also access other data and content over the one or more wired and/or wireless networks. For example, content publishers, such as news sites, Rally Simple Syndication (RSS) feeds, web sites, blogs, social networking sites, developer networks, etc., can be accessed by mobile device 702a or 702b. Such access can be provided by invocation of a web browsing function or application (e.g., a browser) in response to a user touching, for example, a Web object.

Exemplary Device Architecture

Figure 8:
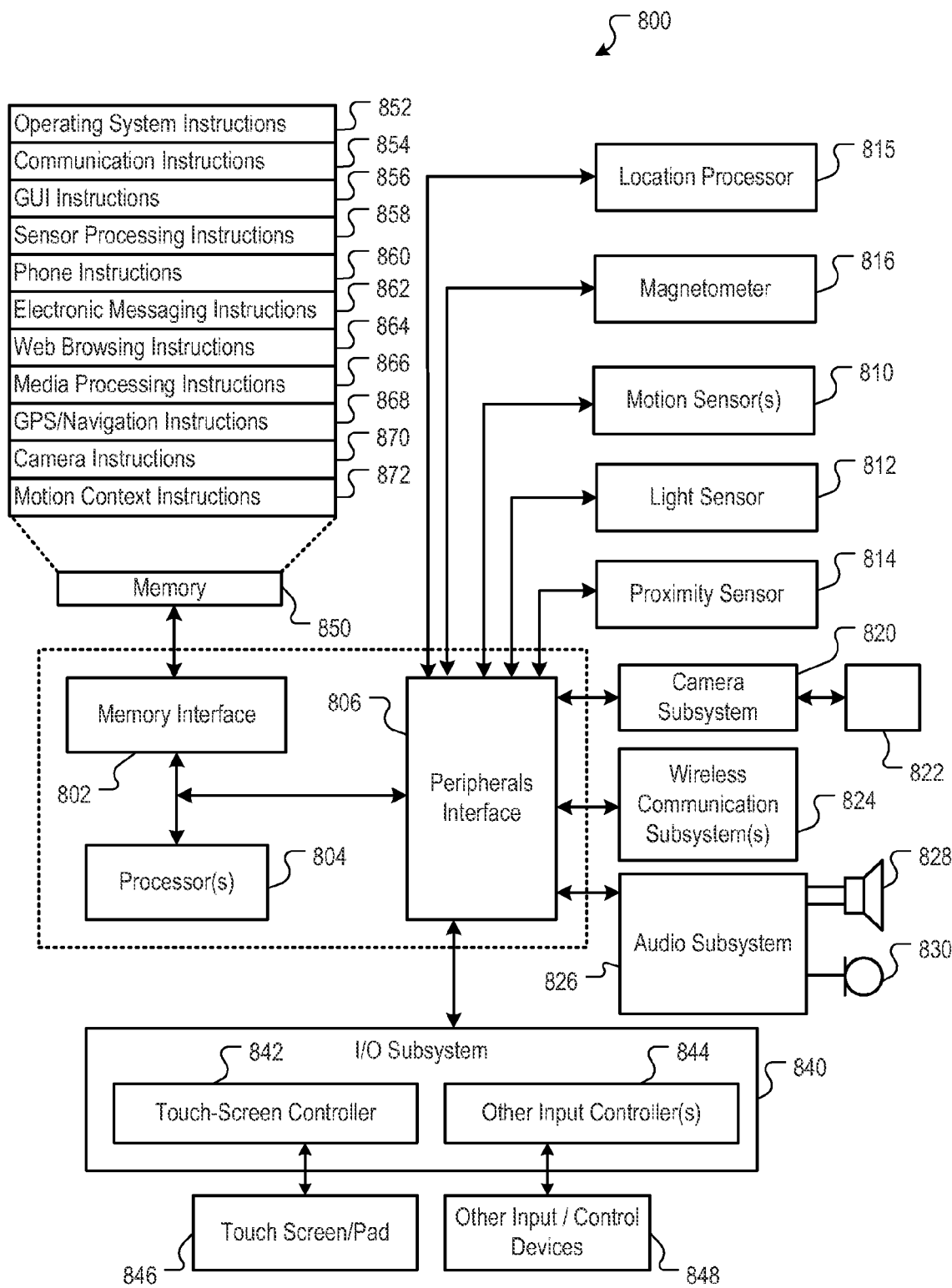
FIG. 8 is a block diagram of an exemplary device architecture that implements the features and processes described with reference to FIGS. 1-7.

FIG. 8 is a block diagram illustrating exemplary device architecture implementing features and operations described in reference to FIGS. 1-7. Device 800 can be any location aware device including but not limited to smart phones and electronic tablets. Device 800 can include memory interface 802, one or more data processors, image processors or central processing units 804, and peripherals interface 806. Memory interface 802, processor(s) 804 or peripherals interface 806 can be separate components or can be integrated in one or more integrated circuits. The various components can be coupled by one or more communication buses or signal lines.

Sensors, devices, and subsystems can be coupled to peripherals interface 806 to facilitate multiple functionalities. For example, motion sensor 810, light sensor 812, and proximity sensor 814 can be coupled to peripherals interface 806 to facilitate orientation, lighting, and proximity functions of the mobile device. For example, in some implementations, light sensor 812 can be utilized to facilitate adjusting the brightness of touch screen 846. In some implementations, motion sensor 810 (e.g., an accelerometer, gyros) can be utilized to detect movement and orientation of the device 800. Accordingly, display objects or media can be presented according to a detected orientation, e.g., portrait or landscape.

Other sensors can also be connected to peripherals interface 806, such as a temperature sensor, a biometric sensor, or other sensing device, to facilitate related functionalities.

Location processor 815 (e.g., GPS receiver) can be connected to peripherals interface 806 to provide geo-positioning. Electronic magnetometer 816 (e.g., an integrated circuit chip) can also be connected to peripherals interface 806 to provide data that can be used to determine the direction of magnetic North. Thus, electronic magnetometer 816 can be used as an electronic compass.

Camera subsystem 820 and an optical sensor 822, e.g., a charged coupled device (CCD) or a complementary metal-oxide semiconductor (CMOS) optical sensor, can be utilized to facilitate camera functions, such as recording photographs and video clips.

Communication functions can be facilitated through one or more communication subsystems 824. Communication subsystem(s) 824 can include one or more wireless communication subsystems. Wireless communication subsystems 824 can include radio frequency receivers and transmitters and/or optical (e.g., infrared) receivers and transmitters. Wired communication system can include a port device, e.g., a Universal Serial Bus (USB) port or some other wired port connection that can be used to establish a wired connection to other computing devices, such as other communication devices, network access devices, a personal computer, a printer, a display screen, or other processing devices capable of receiving or transmitting data. The specific design and implementation of the communication subsystem 824 can depend on the communication network(s) or medium(s) over which device 800 is intended to operate. For example, a mobile device can include communication subsystems 824 designed to operate over a GSM network, a GPRS network, an EDGE network, a WiFi or WiMax network, and a Bluetooth network. In particular, the wireless communication subsystems 824 can include For example, device 800 may include wireless communication subsystems designed to operate over a global system for mobile communications (GSM) network, a GPRS network, an enhanced data GSM environment (EDGE) network, 802.x communication networks (e.g., WiFi, WiMax, or 3G networks), code division multiple access (CDMA) networks, and a Bluetooth™ network. Communication subsystems 824 may include hosting protocols such that the mobile device 800 may be configured as a base station for other wireless devices. As another example, the communication subsystems can allow the device to synchronize with a host device using one or more protocols, such as, for example, the TCP/IP protocol, HTTP protocol, UDP protocol, and any other known protocol.

Audio subsystem 826 can be coupled to a speaker 828 and one or more microphones 830 to facilitate voice-enabled functions, such as voice recognition, voice replication, digital recording, and telephony functions.

I/O subsystem 840 can include touch screen controller 842 and/or other input controller(s) 844. Touch-screen controller 842 can be coupled to a touch screen 846 or pad. Touch screen 846 and touch screen controller 842 can, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch screen 846.

Other input controller(s) 844 can be coupled to other input/control devices 848, such as one or more buttons, rocker switches, thumb-wheel, infrared port, USB port, and/or a pointer device such as a stylus. The one or more buttons (not shown) can include an up/down button for volume control of speaker 828 and/or microphone 830.

In one implementation, a pressing of the button for a first duration may disengage a lock of the touch screen 846; and a pressing of the button for a second duration that is longer than the first duration may turn power to mobile device 800 on or off. The user may be able to customize a functionality of one or more of the buttons. The touch screen 846 can also be used to implement virtual or soft buttons and/or a keyboard.

In some implementations, device 800 can present recorded audio and/or video files, such as MP3, AAC, and MPEG files. In some implementations, device 800 can include the functionality of an MP3 player and may include a pin connector for tethering to other devices. Other input/output and control devices can be used.

Memory interface 802 can be coupled to memory 850. Memory 850 can include high-speed random access memory or non-volatile memory, such as one or more magnetic disk storage devices, one or more optical storage devices, or flash memory (e.g., NAND, NOR). Memory 850 can store operating system 852, such as Darwin, RTXC, LINUX, UNIX, OS X, WINDOWS, or an embedded operating system such as VxWorks. Operating system 852 may include instructions for handling basic system services and for performing hardware dependent tasks. In some implementations, operating system 852 can include a kernel (e.g., UNIX kernel).

Memory 850 may also store communication instructions 854 to facilitate communicating with one or more additional devices, one or more computers or one or more servers. Communication instructions 854 can also be used to select an operational mode or communication medium for use by the device, based on a geographic location (obtained by the GPS/Navigation instructions 868) of the device. Memory 850 may include graphical user interface instructions 856 to facilitate graphic user interface processing; sensor processing instructions 858 to facilitate sensor-related processing and functions; phone instructions 860 to facilitate phone-related processes and functions; electronic messaging instructions 862 to facilitate electronic-messaging related processes and functions; web browsing instructions 864 to facilitate web browsing-related processes and functions; media processing instructions 866 to facilitate media processing-related processes and functions; GPS/Navigation instructions 868 to facilitate GPS and navigation-related processes and instructions for implementing the EKF described in reference to FIGS. 1-7; camera instructions 870 to facilitate camera-related processes and functions; and motion context instructions 872 for implementing the motion context processes described in reference to FIGS. 1-7. The memory 850 may also store other software instructions for facilitating other processes, features and applications, such applications that use the PV estimations provided by system 100, such as applications related to navigation, social networking, location-based services or map displays.

Each of the above identified instructions and applications can correspond to a set of instructions for performing one or more functions described above. These instructions need not be implemented as separate software programs, procedures, or modules. Memory 850 can include additional instructions or fewer instructions. Furthermore, various functions of the mobile device may be implemented in hardware and/or in software, including in one or more signal processing and/or application specific integrated circuits.

Exemplary Dual EFK System

In some implementations, two EKFs can be used in the system. A primary EKF can be used for a predetermined time, referred to as the filter time of applicability (FTOA). If a period of time elapses without a PV update that is longer than FTOA, then two EKFs are used. One EKF uses a static assumption for a portion of time since the last PV update. This is referred to as long-term static (LTS) assumption. The other is the primary EKF unmodified. The LTS EFK can be modified by artificially applying a static motion update, which modifies the process noise matrix Q and performs ZUPT after either a certain period has elapsed or the position uncertainty of the primary EFK has exceeded a threshold. The benefits of the dual EKF method are the ability to perform well when the device is static over long periods and the ability to perform well when the device has moved substantially over long periods.

When a next PV update occurs, a hypothesis test is used to determine if the LTS EKF is valid, and if so, the LTS EKF information is used to estimate PV and to re-seed the primary EKF. For example, if the EKF location estimation (pre-update) is contained within six times the uncertainty of the PV update and the PV update passes innovation testing (e.g., the distance between the EKF location estimate and the PV location is less than six times the 1-sgma uncertainty of the PV location) the static hypothesis is valid. If the LTS assumption fails, then the primary EKF continues to estimate PV and the LTS EKF is re-seeded. The LTS EKF can run as a parallel copy of the primary EKF but it is artificially re-seeded with a static motion update after a time set since the last PV update of the primary EKF, or after a set amount of position uncertainty growth in the primary EKF, which can be determined by examining the magnitude of diagonal elements of the error covariance matrix P. Active cell updates do not apply to the LTS EKF, only to the primary EKF.

Figure 9:
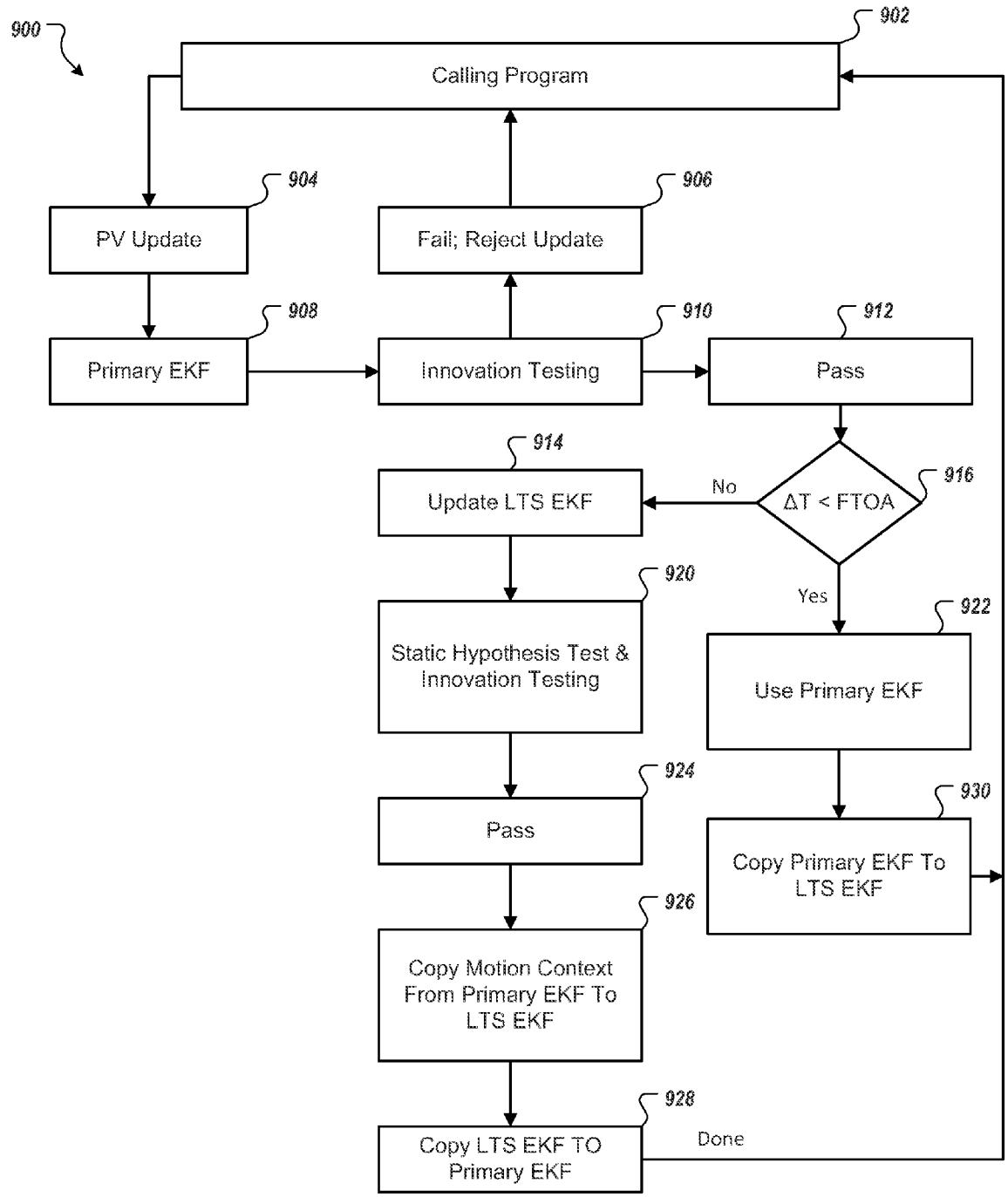
FIG. 9 is a block diagram of an exemplary process that uses two EKFs, including a primary EKF and a second EFK that is configured based on a long-term static (LTS) assumption.

FIG. 9 is a flow diagram of an exemplary process 900 that uses two EKFs, including a primary EKF and a second LTS EFK. In some implementations, process 900 can begin when calling program 902 receives a PV update (904), which is provided to a primary EKF (908). The primary EKF (e.g., state estimator 116) can perform innovation testing (910) to eliminate PV updates that are outside an allowable range. If the innovation testing fails, the PV update is rejected by the primary EKF (906).

If the innovation testing passes (912), the elapsed time Δt since the previous PV update is determined (916). If the elapsed time is less than FTOA, the primary EKF is used for state estimation (922), the primary EKF state and error covariance are used to re-seed the LTF EKF (930), and process 900 returns to calling program (902) with the estimated state vector.

If the elapsed time is greater than FTOA, the LTS EFK is updated with the PV update (914) and a static hypothesis test and innovation testing are performed (920). If the tests pass (924), then the motion context is copied from the primary EKF to the LTS EKF (926) and the LTS EKF state and error covariance are used to re-seed the primary EKF (928), and process 900 returns to calling program (902).

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to, communicate with, one or more mass storage devices for storing data files; such devices include magnetic disks, such as internal hard disks and removable disks; magneto-optical disks; and optical disks.

Storage devices suitable for tangibly embodying computer program instructions and data include all forms of non-volatile memory, including by way of semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a player, the features can be implemented on a computer having a display device, such as a CRT (cathode ray tube) or LCD (liquid crystal display) monitor for displaying information to the player. The computer can also have a keyboard and a pointing device such as a game controller, mouse or a trackball by which the player can provide input to the computer.

The features can be implemented in a computer system that includes a back-end component, such as a data server, that includes a middleware component, such as an application server or an Internet server, or that includes a front-end component, such as a client computer having a graphical user interface or an Internet browser, or any combination of them. The components of the system can be connected by any form or medium of digital data communication such as a communication network. Some examples of communication networks include LAN, WAN and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an API. An API can define on or more parameters that are passed between a calling application and other software code (e.g., an operating system, library routine, function) that provides a service, that provides data, or that performs an operation or a computation. The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API. In some implementations, an API call can report to an application the capabilities of a device running the application, such as input capability, output capability, processing capability, power capability, communications capability, etc.

A number of implementations have been described. Nevertheless, it will be understood that various modifications may be made. For example, other steps may be provided, or steps may be eliminated, from the described flows, and other components may be added to, or removed from, the described systems. Accordingly, other implementations are within the scope of the following claims.

What is claimed is:

1. A method performed by a mobile device, comprising:
   selecting a state observation of the mobile device from a set of observation types including network-derived observations and satellite-derived observations, where the selected observation is input to a state estimator that is configured for receiving network-derived and satellite-derived observations;
   determining that a motion context for the mobile device has changed from moving to static or from static to moving;
   determining one or more dynamic model parameters based on the changed motion context; and
   estimating a state of the mobile device using the state estimator based on the selected observation type and determined dynamic model parameters,
   where the method is performed by one or more hardware processors.

2. The method of claim 1, where network-derived observations are estimated positions derived from at least one of WiFi and cellular networks.

3. The method of claim 1, where the satellite-derived observations are estimated positions or velocities derived from a global navigation satellite system (GNSS).

4. The method of claim 1, where determining a motion context of the mobile device includes determining that the mobile device is moving and the type of movement.

5. The method of claim 1, where estimating a state of the mobile device includes estimating a position or velocity of the mobile device using an estimation filter that includes a dynamic model that is adjusted by the dynamic model parameters to control the uncertainty of growth of the position and velocity estimates.

6. The method of claim 5, where the estimation filter is an extended Kalman filter (EKF).

7. The method of claim 6, where the dynamic model is adjusted by adding additional process noise in a variance-covariance prediction step of the EKF, where the magnitude of the additional process noise depends on the motion context.

8. The method of claim 7, where the additional process noise is generated by a Gauss-Markov process.

9. The method of claim 5, where determining a motion context of the mobile device further comprises:
   determining that the mobile device is static; and
   updating the EKF using a zero-velocity update.

10. A method performed by a mobile device operating in a wireless network, the method comprising:
    determining a motion context of the mobile device;
    tuning a state estimator running on the mobile device based on the determined motion context;
    detecting a cell-hopping event; and updating the state estimator operating on the mobile device based on the determined motion context and the detected cell-hopping event, where the method is performed by one or more hardware processors.

11. The method of claim 10, where the estimator is an extended Kalman filter (EKF).

12. The method of claim 11, further comprising:
updating the EKF with a first position estimate from an active cell; and
updating the EKF with a second position estimate from the candidate active cell.

13. The method of claim 11, further comprising:
determining a dwell time of the mobile device in the active cell;
if the dwell time exceeds a threshold,
  updating the EKF with a first position estimate from the active cell at the same update epoch as the position update from the candidate active cell;
  updating the EKF with a second position estimate from the candidate active cell; and
if the dwell time does not exceed the threshold,
  updating the EKF with a position estimate from the candidate active cell.

14. A system comprising:
one or more processors;
memory storing instructions, which, when executed by the one or more processors, causes the one or more processors to perform operations comprising:
  selecting a state observation of a mobile device from a set of observation types including network-derived observations and satellite-derived observations, where the selected observation is input to a state estimator that is configured for receiving network-derived and satellite-derived observations;
  determining that a motion context for the mobile device has changed from moving to static or from static to moving;
  determining one or more dynamic model parameters based on the changed motion context; and
  estimating a state of the mobile device using the state estimator based on the selected observation type and determined dynamic model parameters,
where the method is performed by one or more hardware processors.

15. The system of claim 14, where network-derived observations are estimated positions derived from at least one of WiFi and cellular networks.

16. The system of claim 14, where the satellite-derived observations are estimated positions or velocities derived from a global navigation satellite system (GNSS).

17. The system of claim 14, where determining a motion context of the mobile device includes determining that the mobile device is moving and the type of movement.

18. The system of claim 14, where estimating a state of the mobile device includes estimating a position or velocity of the mobile device using an estimation filter that includes a dynamic model that is adjusted by the dynamic model parameters to control the uncertainty of growth of the position or velocity estimates.

19. The system of claim 18, where the state estimator is an extended Kalman filter (EKF).

20. The system of claim 19, where the dynamic model is adjusted by adding additional process noise in a variance-covariance prediction step of the EKF, where the magnitude of the additional process noise depends on the motion context.

21. The system of claim 20, where the additional process noise is generated by a Gauss-Markov process.

22. The system of claim 20, where determining a motion context of the mobile device further comprises:
determining that the mobile device is static; and
updating the EKF using a zero-velocity update.

23. A system comprising:
one or more processors;
memory storing instructions, which, when executed by the one or more processors, causes the one or more processors to perform operations comprising:
  determining a motion context of a mobile device;
  tuning a state estimator running on the mobile device based on the determined motion context;
  detecting a cell-hopping event; and
  updating the state estimator operating on the mobile device based on the determined motion context and the detected cell-hopping event.

24. The system of claim 23, where the state estimator is an extended Kalman filter (EKF).

25. The system of claim 24, where the operations further comprise:
updating the EKF with a first position estimate from the active cell; and
updating the EKF with a second position estimate from the candidate active cell.

26. The system of claim 23, where the operations further comprise:
determining a dwell time of the mobile device in the active cell;
if the dwell time exceeds a threshold,
  updating the EKF with a first position estimate from the active cell at the same update epoch as the position update from the candidate active cell;
  updating the EKF with a second position estimate from the candidate active cell; and
if the dwell time does not exceed the threshold,
  updating the EKF with a position estimate from the candidate active cell.

27. A method performed by a mobile device, comprising:
receiving a state update;
determining if an elapsed time since a last state update is less than a predetermined time period; and
if the elapsed time is less than a predetermined time period:
  providing a state estimate with a first state estimator, and
  re-seeding a second state estimator with parameters from the first state estimator,
where the second estimator is configured based on a long-term static assumption;
if the elapsed time is greater than a predetermined time period:
  updating the second state estimator with the state update;
  performing a static hypothesis test and an innovation test, and
  if the hypothesis and innovation tests pass,
    copying motion context data from the first estimator to the second estimator; and
    re-seeding the first state estimator with parameters from the second state estimator,
where the method is performed by one or more hardware processors.

* * * * *

UNITED STATES PATENT AND TRADEMARK OFFICE
CERTIFICATE OF CORRECTION

PATENT NO.        : 8,615,253 B2                                           Page 1 of 1
APPLICATION NO.   : 13/153329
DATED             : December 24, 2013
INVENTOR(S)       : Glenn Donald MacGougan et al.

It is certified that error appears in the above-identified patent and that said Letters Patent is hereby corrected as shown below:

On the Title Page, Item (56) in the listing of Other Publications, Page 2, column 2, line 16, delete "Magenetic" and insert -- Magnetic --.

Signed and Sealed this
Third Day of June, 2014

Michelle K. Lee
*Deputy Director of the United States Patent and Trademark Office*